Dec. 25, 1962    A. SIMMON ET AL    3,069,971
EXPOSURE CONTROL APPARATUS FOR MAKING COLOR PRINTS
Filed Jan. 18, 1960    2 Sheets-Sheet 1
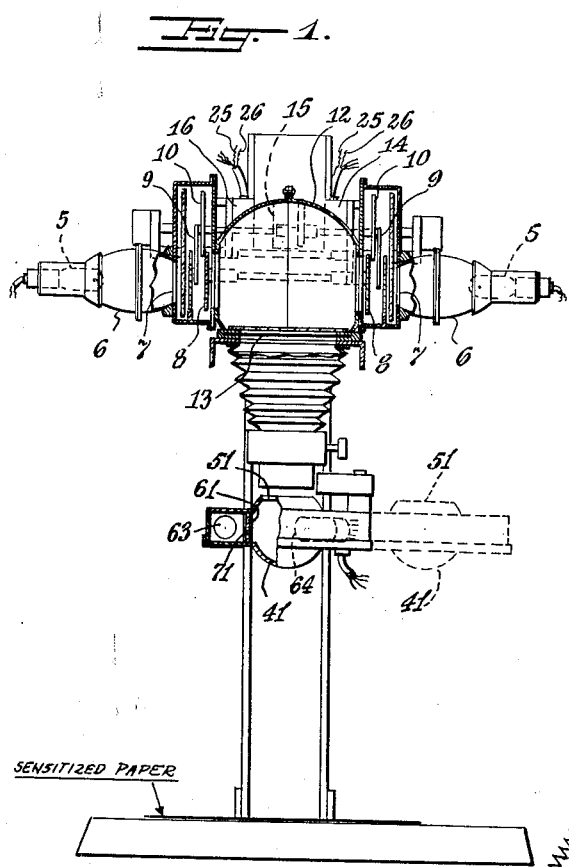
Fig. 1.
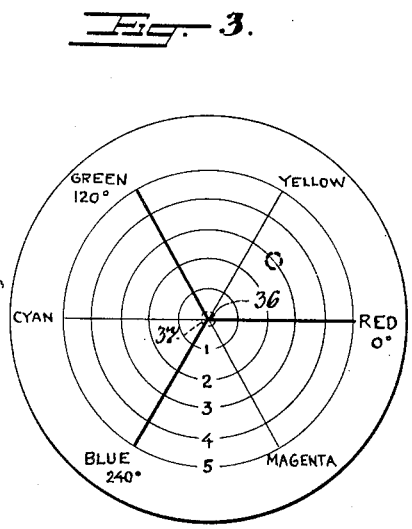
Fig. 3.
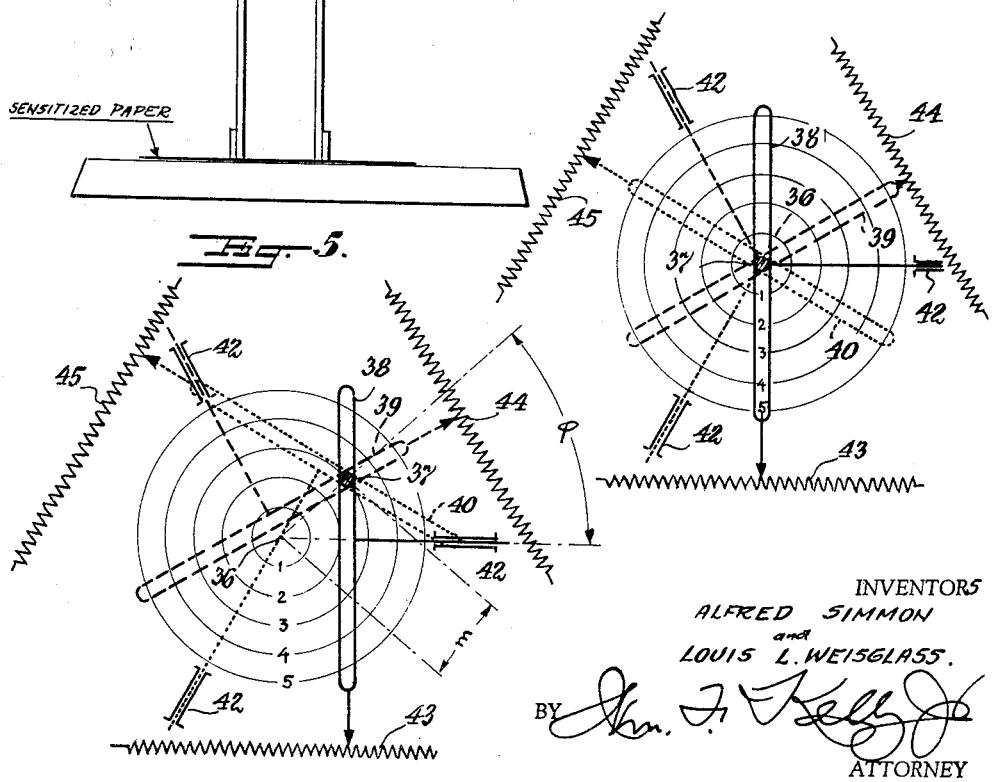
Fig. 4.
Fig. 5.
INVENTORS
ALFRED SIMMON
and
LOUIS L. WEISGLASS.
BY 
ATTORNEY Dec. 25, 1962  A. SIMMON ET AL  3,069,971
EXPOSURE CONTROL APPARATUS FOR MAKING COLOR PRINTS
Filed Jan. 18, 1960  2 Sheets-Sheet 2
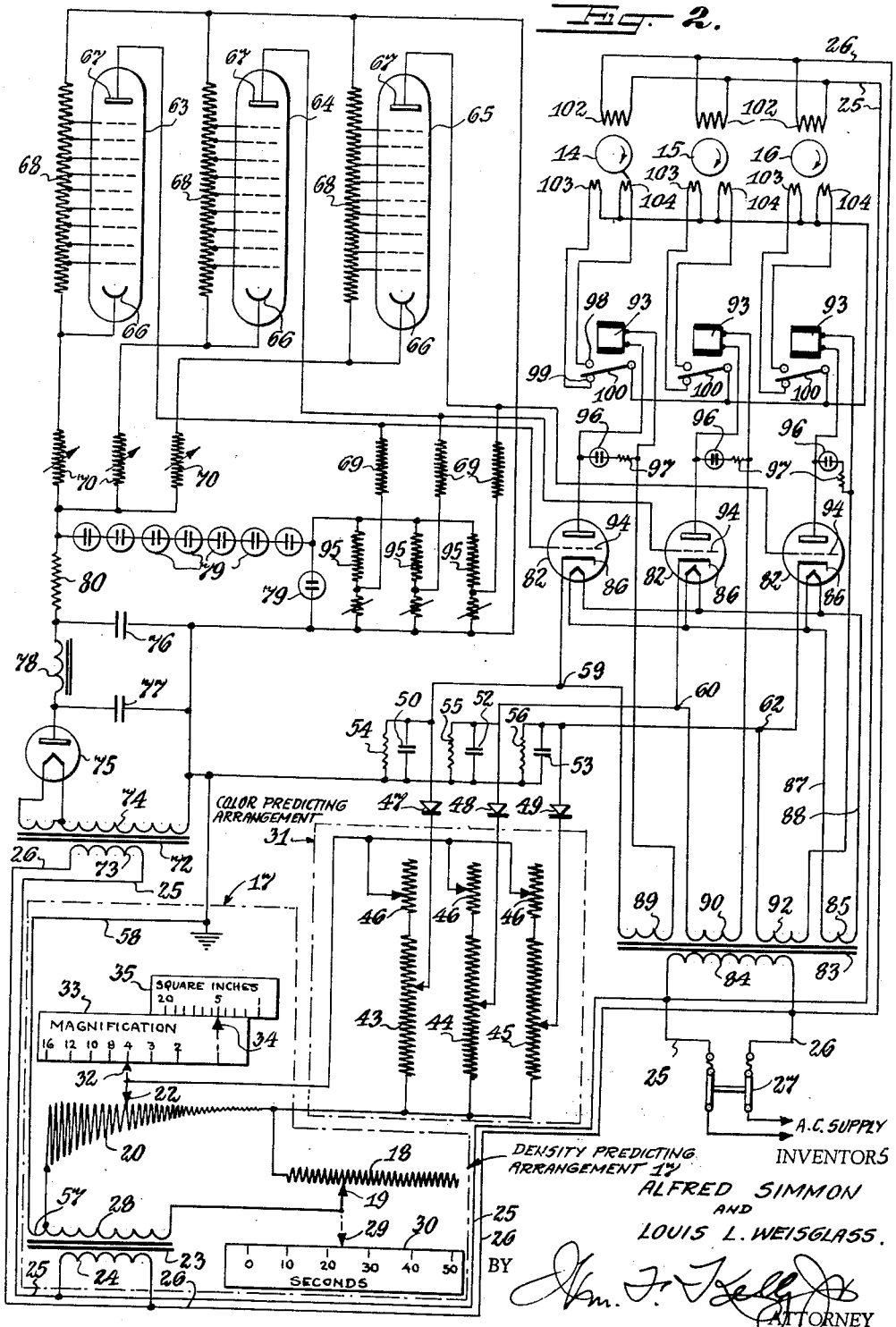
INVENTORS
ALFRED SIMMON
AND
LOUIS L. WEISGLASS.
BY
ATTORNEY United States Patent Office 3,069,971
Patented Dec. 25, 1962

3,069,971
EXPOSURE CONTROL APPARATUS FOR MAKING COLOR PRINTS
Alfred Simmon, Garden City, and Louis L. Weisglass, New York, N.Y., assignors to Simmon Brothers, Inc., Long Island City, N.Y., a corporation of New York
Filed Jan. 18, 1960, Ser. No. 3,033
8 Claims. (Cl. 88—24)

The present invention relates to an exposure control apparatus and more particularly to such an apparatus for use in connection with the making of color prints or enlargements from a film transparency, which may be either negative or positive.

Apparatus of this general nature is known to the art but has heretofore required considerable empirical determination by an operator and even then is not too reliable in its repetitive operation after having been once adjusted to produce a desired color rendition of the print. By proper adjustment of the apparatus of the present invention such defects heretofore existing are eliminated so that a plurality of color prints can be made from any transparency with each succeeding color print having the same precise color rendition for which the apparatus has been preselectably adjusted by an operator.

It is accordingly the primary object of the present invention to provide an exposure control apparatus which can be readily and accurately preset by an operator to correct for color deficiencies and once a preselected adjustment is made all color prints of a given negative are thereafter produced with fidelity of color.

Another object of the present invention is the provision of an exposure control apparatus which is economical to manufacture and exceedingly reliable in its operation of causing the reproduction of a colored film negative with preselected color correction and wherein the desired color rendition results regardless of the number of prints made from any given negative.

Still further objects of the present invention will become obvious to those skilled in the art by reference to the accompanying drawings wherein:

FIGURE 1 shows the illuminating system of a photographic printer or enlarger of a type such as preferably used in the making of color prints and enlargements and with which the apparatus of the present invention is employed, FIG. 2 is a schematic illustration of the electrical circuitry of the exposure control apparatus of the present invention.

FIG. 3 is an indicator chart which forms a part of the exposure control apparatus of the present invention to enable an operator to preselect the adjustment of the apparatus to produce a desired color correction, FIG. 4 is a schematic showing of the analogue computer position of the exposure control apparatus of the present invention, and FIG. 5 is a view identical to that of FIG. 3 but showing one position to which the analogue computer portion has been adjusted to correct for both magnitude and direction of a defective color.

Referring now to the drawings in detail the illuminating system of a photographic printer or enlarger is shown in FIG. 1, which is of the type shown and claimed more in detail in the copending application of Alfred Simmon, one of the present joint applicants, Serial No. 792,152, filed February 9, 1959, now U.S. Patent No. 3,028,483 issued April 3, 1962 and assigned to the same assignee as the present invention. As shown in FIG. 1, such system may include a lamp 5 but preferably comprises several which are respectively surrounded by specular light-collecting reflectors 6 whereby a very high percentage of the emitted light is caused to pass through an aperture 7 in front of which a number of adjustable filters 8, 9 and 10 is arranged. These filters are preferably in colors complementary to the primary colors of the selected system, i.e., in a three color system with the customary primary colors of red, green and blue, the filters 8, 9 and 10 would be "cyan," "magenta" and "yellow."

After passing through one or several of these filters the light enters a mixing chamber or integrating sphere 12, which has a non-glossy, diffusely reflecting white interior, so that by repeated diffuse reflection the light is uniformly distributed over the area of a film transparency 13 and passes therethrough where the usual adjustable focusing lens projects an enlarged image of the transparency on a sensitized color paper which is disposed a suitable distance below the lens on a base or table. Also, as herein shown in FIG. 1, the entire assembly is attached to a supporting structure which extends vertically from a suitable base that also holds the sensitized paper. Each of the filters 8, 9 and 10 are coupled to an individual reversible motor 14, 15 and 16, with the motor for each filter of the same color being mechanically connected and hence simultaneously operable, so that such pair of identical color filters are operated by its own individual motor into and out of the light beam emerging from the respective apertures 7 and passing into the mixing chamber 12. These motors 14, 15 and 16 are operable in response to preselected settings made by the operator to the exposure control apparatus of the present invention, as hereinafter described more in detail, and with such color filters being operable in somewhat similar manner to that as shown and described in the aforesaid copending application, Serial No. 792,152, filed February 9, 1959 and assigned to the same assignee as the present invention.

Although only three filters corresponding to primary colors have been shown and will be herein referred to, it is to be understood that a smaller or larger number of filters with their respective controls can be employed and hence the present invention is not to be construed as limited to only three primary colors as herein described.

By reference now more specifically to the circuit diagram of FIG. 2, it is to be noted that the exposure control apparatus as therein shown actually comprises a predicting circuit which includes a density control section and a color control section, a circuit for measuring actual light intensities of the three primary colors, a decision making circuit which is responsive to the differences between the outputs of the predicting and measuring circuits for the respective primary colors and which decision making circuit controls operation of the respective filter motors for the moving of one or the other of the filters of the primary colors into the light beam of the photographic printer as shown in FIG. 1.

*Predicting Circuit*

A satisfactory color print must meet two essential conditions, namely, satisfactory density and satisfactory color. Hence the purpose of the light predicting circuit is to generate three voltages which are proportional to the light intensities of the three primary colors required to produce a desired color print and is actually divided into a density predicting arrangement and a color predicting arrangement.

This density predicting arrangement has been specifically shown and claimed in copending application, Serial No. 9,265, filed February 17, 1960, by one of the present joint applicants and which is assigned to the same assignee as the present invention. It should accordingly suffice to describe herein only so much of the density predicting arrangement as is necessary to an understanding of the present invention. The light or light intensity (by which is meant the intensity of the light flux passing the lens of the photographic printer or enlarger) required for a satisfactory print is proportional to the square of the magnification, proportional to the area of the negative, or more precisely the area of the aperture of the negative holder, and substantially inversely proportional to the exposure time. The slight deviation from a strict inverse proportionality is due to the failure of the reciprocity law for sensitized materials since they vary somewhat from one supply to another.

Accordingly the density predicting arrangement 17, as shown in FIG. 2, comprises a rheostat consisting of a resistor 18 engageable by a movable contact 19 and a potentiometer consisting of a resistor 20 also engageable by a movable contact 22. A substantially one-to-one ratio isolation transformer 23 having its primary winding 24 connected by suitable conductors 25 and 26 and through a suitable main-line switch 27 to an "A.C. supply," supplies a predetermined constant input voltage from its secondary winding 28 to the moving contact 19 and to one end of the resistor 20, and an output voltage is derived from a point between the connection of resistor 18 with resistor 20, and the movable contact 22. As shown, the movable contact 19 is mechanically connected to a pointer 29 coacting with a stationary scale 30, which is calibrated in seconds denoting exposure times.

The voltage impressed upon the resistor 20 is inversely proportional to its total resistance plus the resistance of that part of resistor 18 connected by the pointer 19 at any time in series with the resistor 20. By making the time values on the scale 30 proportional to the corresponding resistance values of resistor 20 plus that part of 18 connected in series therewith, the voltage across resistor 20 also becomes inversely proportional to the exposure time to which the pointer 29 has been adjusted on the scale 30. In a similar manner the movable potentiometer contact 22 is mechanically connected to a pointer 32 registering with a slidable scale 33 graduated in "Magnification" and a pointer 34 on this scale 33 registers with a stationary scale 35 graduated in "Square Inches." The graduations on the "Magnification" scale 33 are spaced in accordance with the logarithms of $$\left(\frac{M}{M_{min}}\right)^2$$

where $M$ is the Magnification to which the system is adjusted and $M_{min}$ the smallest possible magnification within the range of the device.

The graduations on the scale 35 are similarly spaced in accordance with the logarithms of $$\frac{A}{A_{min}}$$

where $A$ is the area of the negative to be printed and $A_{min}$ the area of the smallest film negative. Accordingly, the scales 33 and 35 together with the pointers 32 and 34 form a slide rule in which the horizontal distance between the origin of graduation on scale 35 and the movable pointer 32 becomes proportional to:

$$\text{Log}\left(\frac{M}{M_{min}}\right)^2 + \text{Log}\left(\frac{A}{A_{min}}\right)$$

and this expression is of course a function of $M^2 \cdot A$.

Thus by designing the potentiometer so that the resistance value of its resistor 20 at every point along its length varies non-linearly and becomes respectively proportional directly to $M^2 \cdot A$, as indicated by the scales 33 and 35, instead of to the logarithmic expression, the voltage across that portion of resistor 20 between the contact 22 and the end thereof connected to resistor 18 becomes proportional to $M^2 \cdot A$. As hereinbefore pointed out, the voltage across the entire resistance of resistor 20 is inversely proportional to the exposure time to which resistor 18 has been set by its contact 19 in accordance with the exposure time to which scale pointer 29 has been adjusted. The same is also true with respect to that portion of resistor 20 between its end connected to the resistor 18 and its contact 22, and this voltage is therefore proportional to $$\frac{1}{T}$$

as well as to $M^2 \cdot A$, or in other words it is proportional to $$\frac{M^2 \cdot A}{T}$$

From the foregoing it should be apparent that the herein described density predicting arrangement 17 will produce a preselected output voltage in accordance with desired exposure time and magnification. It should also be mentioned that in the aforesaid copending application, Serial No. 9,265 filed February 17, 1960, specifically describing in detail and claiming such density predicting arrangement, a more commercially practical design has been shown wherein more conveniently rotatable mechanisms are utilized, a timer is employed to operate some of the variable contacts so that the operator when selecting the exposure time automatically adjusts the density predicting circuit accordingly.

The color predicting arrangement portion 31 of the light predicting circuit of the present invention is provided for the purpose of enabling the operator to determine in advance the ratios of the three primary colors relative to each other so as to produce a colored print of desired color rendition. Also any adjustment of the ratios of the primary colors must in no way alter the sum of their intensity, since this would change the density of the finished print which has already been adjustably preselected by the density predicting arrangement above-described. Again a commercially practical analogue computer for use as a color predicting arrangement has been shown and described more in detail in the copending application of Alfred Simmon, Serial No. 3,032, filed concurrently herewith, now U.S. Patent No. 3,027,801, issued April 3, 1962, and assigned to the same assignee as the present invention. It is accordingly believed unnecessary to describe such computer in detail herein but only to set forth sufficient disclosure so that its operation is thoroughly understood in conjunction with the exposure control apparatus of the present invention.

Such color predicting arrangement can be best understood first by reference to FIG. 3 which comprises an indicating chart having a heavy radial line extending from its axis 36 to "Red 0°" at the circumference of the chart, and similar heavy lines likewise extend from such axis to the legends "Green 120°" and "Blue 240°" at the circumference. Similarly lighter radial lines bisect the angles formed by the heavy lines which lighter lines also extend from the axis 36 to circumferential legends "Yellow," "Cyan" and "Magenta," so that all such radial lines thus indicate a direction for desired color correction while the five concentric circles of FIG. 3 depict magnitude for any such color correction. Thus a universally mounted master element 37, such as shown in FIG. 4, when disposed on the axis 36 of the chart and thus in the neutral grey position, is moved in any desired direction a given distance within any one of the concentric circles a preselected adjustment of color correction both in magnitude and direction is thereby made when such movement is utilized to effect certain controls.

This can be better appreciated by reference to FIG. 4 wherein the master element 37 is shown in cross-section as being of cylindrical configuration coincident with the axis 36 and is so mounted as to be freely movable by an operator from the axis 36 in all directions parallel to itself, or in other words in all directions at right angles to its longitudinal axis. Three elongated T-shaped members 38, 39 and 40 linearly movable in respective bearings 42, and which may be considered as corresponding to the three primary colors of red, green and blue, are each disposed in slightly spaced parallel planes, so that the master element 37 passes through slots in the top of the T of each member. Assuming that an examination of a colored negative shows a color correction for the "red" to be desirable, the operator then moves the master element 37 to the position shown in FIG. 5, and which corresponds to the dotted circle as shown in FIG. 3 as a new position for the axis 36.

All the tops of the T-shaped members 38, 39 and 40 now occupy different positions as shown in FIG. 5 which means that their respective base portions have linearly moved within their respective bearings 42 and hence changed the resistance setting of their adjacent potentiometer 43, 44 or 45 with which they are respectively connected. Accordingly, the master element 37 will have been moved from the axis 36, or its neutral grey position, a distance $m$ corresponding to the magnitude of the desired "red" color correction and through an angle $\varphi$. Simultaneously, the three T-shaped members 38, 39 and 40 which are mechanically linked to the master element 37 will have been displaced $m \cos \varphi$, $m \cos (120°-\varphi)$ and $m \cos (240°-\varphi)$ while the sum of their displacement will be zero because $\cos \varphi + \cos (120°-\varphi) + \cos (240°-\varphi) = 0$ and hence the adjustment of the master element 37 to preselect the color prediction has no effect upon the density, as set forth in detail in the aforesaid copending application, Serial No. 3,032, filed concurrently herewith.

The preselected output voltage from the above-mentioned density predicting arrangement 17 is accordingly supplied to the parallel connected potentiometers 43, 44 and 45 of the color predicting arrangement 31, as shown in FIG. 2. It will be noted from this latter figure that each of the three potentiometers 43, 44 and 45 is connected in series with an adjustable rheostat 46 for the purpose of providing additional optional adjustment, solely for the purpose of compensating for variation in the relative sensitivity of particular batches of sensitized paper, and once each of these rheostats 46 has been set for the respective primary colors of red, green and blue for a given batch of sensitized paper, they need not be further adjusted until another batch having different sensitivity for these three primary colors is employed, and which very frequently occurs even with batches of sensitized paper from the same manufacturer.

The three output voltages from the light predicting circuit, which includes the density predicting arrangement 17 and the color predicting arrangement 31 as hereinabove described, are then rectified by suitable rectifiers 47, 48 and 49, with the ripple of the resultant unidirectional currents being smoothed out by capacitors 50, 52 and 53 which are bridged by bleeder resistors 54, 55 and 56. It is to be noted that there is a small voltage loss of about one-fifth of a volt in the rectifiers 47, 48 and 49 and so compensation is made therefor by providing a low voltage winding 57 of a few turns on the secondary winding of transformer 23 and which is connected by grounded conductor 58 to the unidirectional output side of the predicting circuit as seen in FIG. 2, so that the three output voltages, which have been preselected by the predicting circuit in accordance with desired density and color correction, causes points 59, 60 and 62 to assume negative voltages with respect to ground which are proportional to the respective light intensities of the primary colors of red, green and blue as preselected by an operator to produce a satisfactory color print.

*Light Measuring Circuit*

Although any suitable photosensitive device, together with amplifiers if need be, may be employed in connection with the light measuring circuit forming part of the exposure control apparatus of the present invention, it has been found more feasible to utilize photomultiplier tubes 63, 64 and 65, as shown in FIG. 2. The photographic printer or enlarger as shown in FIG. 1 is preferably provided with a light distributing element supported by a bracket or the like so as to be swung into a position immediately beneath the lens system and which usually takes the form of a small integrating sphere 41 having a vertical aperture 51 through which the light beam from the lens system enters the interior of the sphere. In addition such distributing element desirably has at least three radially spaced horizontal ports or apertures, only one of which 61 is shown, through which light from the photographic printer emerges and after passing through a filter 71 of one of the primary colors, such as red, green and blue, falls upon one of the aforesaid photomultiplier tubes 63, 64 and 65, one of which is disposed adjacent each one of the respective apertures 61. Such distributing element per se is well known in the prior art, being shown and described more in detail, for example, in U.S. Patent No. 2,574,264, issued November 6, 1951 and hence such device need not be further detailed herein.

The aforesaid photomultiplier tubes are each provided with photosensitive cathodes 66 and anodes 67 and the customary intermediate electrodes or dynodes are arranged therebetween with all such electrodes being connected respectively to corresponding points of individual voltage dividers 68, so that the section connected to the respective anodes 67 has a resistance of approximately 100,000 ohms and all other sections a resistance of approximately 40,000 ohms, and the voltages between adjacent dynodes ranges from approximately 70 volts to 100 volts. The anodes 67 of the three photo-multiplier tubes 63, 64 and 65 are each connected through high ohmic resistors 69 to points almost at ground potential, as hereinafter described more in detail, and the voltage dividers 68 are connected through a respective variable resistor 70 to one side of a high voltage supply source, so that the voltage between adjacent dynodes of each respective photomultiplier tube and hence its sensitivity can be adjusted by the setting of its associated variable resistor 70.

The power supply for the three photomultiplier tubes 63, 64 and 65 comprises a high voltage transformer 72 having its primary winding 73 also connected to the "A.C. supply" by conductors 25 and 26 and a secondary winding 74, the major portion of which produces a voltage to ground of about 1300 volts, while a small low voltage section supplies heating energy for the thermionic cathode of a rectifier valve tube 75. This 1300 volt output is rectified by the rectifier 75 and fed into a filter comprising a pair of parallel connected capacitors 76 and 77 and a series connected choke coil 78. Inasmuch as photomultiplier tubes are extremely sensitive to impressed voltages it is essential in the interest of accuracy that such voltages be kept constant and independent of line voltage fluctuations and the like.

Accordingly a voltage stabilizer is provided which comprises a plurality of series connected gas tubes 79 bridged across the high voltage supply source, and in series with a resistance element 80 ahead of the three variable resistors 70, so that the voltage supplied at any given moment to the respective photomultiplier tubes 63, 64 and 65 will always remain at a constant value entirely independent of all voltage fluctuations which latter are absorbed by the resistance element 80. Consequently, the voltage passing the respective photomultiplier tubes 63, 64 and 65 causes the grid of an electronic tube, such as a thyratron 82 forming part of a "decision making circuit" and to which the anode 67 of each photomultiplier tube is respectively connected, to be subjected to a negative voltage with respect to ground which is proportional to the light intensity of the particular primary color falling upon the respective photomultiplier tubes 63, 64 and 65.

*Decision Making Circuit*

In addition to the three thyratron tubes 82, the decision making circuit comprises an insulating transformer 83 having its primary winding 84 connected by the supply conductors 25 and 26 to the "A.C. Supply" through the main line switch 27. Such transformer 83 is provided with a low-voltage winding 85 for supplying heating energy to the filaments of the indirectly heated cathodes 86 of each of the thyratron tubes 82 through conductors 87 and 88, with such cathode 86 of each thyratron tube in turn being connected to the respective aforesaid points 59, 60 and 62 carrying the corresponding output voltages from the predicting circuit. The transformer 83 is also provided with three additional secondary windings 89, 90 and 92 each of which supplies energy to a switching element, such as the coil 93 of a relay, when the respective thyratron tube 82 with which such relay and secondary winding is connected, becomes conductive. The grid 94 of each thyratron tube 82 is connected to one of the respective high ohmic resistors 69 and to the anode 67 of one of the photomultiplier tubes, and hence to the three output voltages of the hereinbefore mentioned light measuring circuit.

All of the voltages impressed upon the thyratron tubes 82 are negative with respect to ground but more or less negative relative to the voltage impressed upon the corresponding electrode of its particular tube, or in other words, the grid 94 may be positive or negative with respect to its adjacent cathode 86 depending upon the voltages to which such electrodes are subjected at any given moment. When, however, the grid 94 does become positive relative to the cathode 86 the thyratron tube 82 then becomes conductive thus allowing current to flow therethrough from its associated secondary winding 89, 90 or 92 to energize the relay coil 93 connected thereto. It is also to be noted that a characteristic of thyratron tubes is that they do not change their state of conductivity when the potential difference between grid and cathode reaches zero and hence such tubes become non-conductive only when the grid goes negative by two or three volts relative to the negative voltage of the cathode to thus produce a grid bias.

Such grid bias voltage is provided by a voltage divider 95 for each thyratron tube grid, all three of which are connected in parallel across the gas stabilizing tube 79 nearest to ground and to one of the high ohmic resistors 69. Inasmuch as the voltage across such gas stabilizing tube 79 is of approximately 100 volts and a voltage of about 3 volts is required for the grid bias, the upper portion of each voltage divider 95 has a resistance of the order of 100,000 ohms and the lower preferably adjustable portion thereof a resistance of about 3,000 ohms. As shown in FIG. 2, a small neon lamp 96 in series with a small current resistor 97 is connected in parallel with each of the relay coils 93 for a purpose to be hereinafter described more in detail, and each relay has a normally open contact 98 and normally closed contact 99 engageable by the relay armature 100.

The reversible motors 14, 15 and 16 for operating the filters 8, 9 and 10 of the three primary colors as shown in FIG. 1, may be of any suitable type, but as shown in FIG. 2 are of the so-called shaded coil type, because of their ready availability and simple design. Such motors are each provided with a field coil 102 connected by the conductors 25 and 26 to the "A.C. Supply" and have two shading coils 103 and 104, so that when the coil 103 is closed by the engagement of the relay armature 100 with the normally closed contact 99 such motor will rotate in one direction, and when the other shading coil 104 is closed by engagement of the relay armature 100 with its normally open contact 98, upon energization of the relay coil 93, the filter operating motor will rotate in an opposite direction.

In the actual operation of the exposure control apparatus of the present invention the operator first inserts a negative or transparency into the photographic printer or enlarger as shown in FIG. 1 and adjusts the device for the desired magnification. He then adjusts the potentiometer contact 22 in accordance with the negative size and desired magnification setting as selected from the scales 33 and 35 and then selects a suitable exposure time on the scale 30 or by setting an electric timer which automatically adjusts the contact 19 along the resistor 18. Such time setting does not have to be extremely accurate since the final adjustment of the filters 8, 9 and 10 which is auto-matically done will in any event govern the exposure. Also, in most all instances the color predicting arrangement should be set for the first trial print in the neutral grey position, i.e., with the master element 37 so positioned that the potentiometers 43, 44 and 45 all have the same setting, such as shown in FIG. 4 wherein the movable contact is in the center of each respective potentiometer. Likewise for the first test print it is desirable to set all the adjustable rheostats 46 in the center of their respective range.

Thereafter the operator switches on the light source of the photographic printer or enlarger, swings the photocell assembly comprising the integrating sphere 41 carrying the photomultiplier tubes 63, 64 and 65 into position beneath the enlarging lens, and energizes all circuits by closing the main switch 27. This, as previously mentioned, causes the points 59, 60 and 62 and hence the cathodes 86 of the respective thyratron tubes 82 to assume certain negative voltages to ground, with such voltages being determined by the information the operator has fed into the predicting circuit, by preselecting the adjustments on the various scales 30, 33, 35 and the chart of FIG. 3, and which voltages are proportional to light intensities of three primary colors as required for a satisfactory print. Simultaneously with closure of the main switch 27 the grids 94 of the respective thyratron tubes 82 likewise are impressed with negative voltages with respect to ground which are proportional to the intensities of light of three primary colors passing the enlarger lens and falling upon the respective primary color filters 71 of the photocell assembly.

Consequently, there will generally be a voltage differential between the cathodes 86 and grids 94 of each of the respective thyratron tubes 82 which will make the grid positive with respect to its associated cathode in some instances thus making that particular thyratron tube then conductive. Upon any one of these thyratron tubes 82 becoming conductive its controlled relay coil 93 is energized, causing the armature 100 thereof to open the normally closed contact 99 and close the normally open contact 98 with attendant closing of the shading coil 104 of the reversible motor 14, 15 or 16 with which such relay 93 is associated. Taking reversible motor 14 as an example, closing of its shading coil 104 causes such motor to rotate clockwise as indicated by the arrow in FIG. 2. If all adjustments have been correctly chosen, this clockwise rotation of motor 14 lowers the amount of filtration in the light beam by rendering one filter, for example a yellow filter 8 of FIG. 1, less dense and hence this will increase the light intensity falling upon the photomultiplier tube 63 associated with a "blue" filter 71 (FIG. 1).

This will increase the negative potential impressed upon associated grid 94 of thyratron tube 82 until the potential difference between the grid 94 and cathode 86 becomes zero. However, the moving filter 8 and its motor 14 have a small non-negligible amount of inertia and thus does not come to rest at the point of equilibrium but actually will "overshoot." As soon as this occurs everything reverses, so that the grid 94 of thyratron tube 82 now becomes more negative than associated cathode 86 giving such grid a sufficiently negative grid bias as to cause tube 82 to then become non-conducting. One relay coil 93 at the extreme left of FIG. 2 is accordingly deenergized causing its armature 100 to return to its former position in engagement with normally closed contact 99 and thus opening shading coil 104 when the armature 100 separates from normally open contact 98. Since the shading coil 103 is now closed, the filter motor 14 reverses and rotates in a counter-clockwise direction, as viewed in FIG. 2, thus increasing the density of the yellow filter 10 in the light beam and thereby lowering the "blue" light impinging on photomultiplier tube 63, until the potential difference between grid 94 and cathode 86 again disappears and such grid assumes a positive bias and again renders thyratron tube 82 conductive.

There is again an "overshooting" due to the inertia of the filter 8 and motor 14 but this time in an opposite direction and the sequence again repeats itself as long as the circuits remain energized. It is to be understood, of course, that this sequence of operation also applies to the filters 9 and 10 which are operated by their respective motors 15 and 16 in response to the "red" and "green" light falling at any given moment on their associated photomultiplier tube 64 or 65. From the foregoing it is equally obvious that the system shortly reaches sustained oscillation around the point of equilibrium. It has also been found that by using suitable electrical and mechanical parameters the amplitude of these sustained oscillations can be made so small as to become negligible and hence the system for all intents and purposes does come to a standstill at or very close to the point of equilibrium.

When such condition has been reached the neon lamps 96 will flicker rhythmically, since they are in electrical parallel with the respective relay coils 93 which are continually switched on and off by operation of their associated thyratron tubes 82, and hence such lamps 96 function as a signal to the operator that the system is properly adjusted. At this time the operator then turns off the light source, removes the photocell assembly from beneath the enlarger lens, places a sheet of sensitized paper on the base of the printer and makes an exposure in the usual manner. It sometimes happens, however, that a negative will transmit so little light, or conversely so much light, that the condition of equilibrium cannot be reached at all.

For example, if the film negative is exceptionally dense then the photomultiplier tube 63 will receive so little "blue" light, even after the yellow filter 8 has been reduced to zero, that the grid 94 of thyratron tube 82 is still less negative than its cathode 86 which thus produces a positive grid bias making thyratron 82 continuously conductive with attendant sustained energization of relay coil 93 holding armature 100 in engagement with normally open contact 98 and hence motor 14 in continued clockwise rotation. This condition is signalled to the operator by continued illumination from the neon lamp 96 instead of its normal rhythmic flickering. Under such conditions in order to restore normal operation the operator must either open the iris diaphram of the printer lens or increase the exposure time. The first expedient increases the intensity of the light falling on the photomultiplier tube 63 and thereby causes the negative voltage supplied to the grid 94 of thyratron tube 82 to rise. Resort to the second expedient decreases the output voltage of the predicting circuit, by moving the timer operated contact 19, which thereby causes the negative voltage supplied to the cathode 86 of thyratron tube 82 to become lower. However, the application of either expedient immediately restores the conditions essential for reestablishment of equilibrium.

Conversely, if the film negative passes too much light the resultant voltage impressed upon the control grid 94 is such as to prevent the thyratron tube 82 from becoming conductive with the result that the neon lamp does not light up at all. When this condition arises the operator must again resort to either of the above-noted expedients but in reverse operation, namely, close the iris diaphram of the lens slightly or shorten the exposure time either of which will again restore conditions for equilibrium.

In most instances the above-described operation will produce good or at least acceptable prints. The exceptions are those pictures representing scenes that do not "integrate" to a neutral grey. In such instances the color predicting circuit, or more specifically the master element 37 must be shifted from its central neutral grey position to some other position representative of the real "integrated" color. Sometimes such new position can be estimated before a print is made, such, for example, as a scene showing blue sky, blue water and green trees, which obviously will not integrate to a neutral grey but to some blue-green color, and hence a shift of the master element 37 toward the blue-green, as seen on the chart of FIG. 3, will immediately produce a better print. More often, however, the necessary color correction can be more accurately determined after a first trial print with the master element 37 in its central neutral grey position. Thereafter such master element can then be moved towards the color that needs more emphasis, or what may be more readily discernible to the average eye, away from the color which is too pronounced.

From the foregoing it should thus become obvious to those skilled in the art that an exposure control apparatus is provided by the present invention which can be readily and accurately preset by an operator to correct for color deficiencies, and once such apparatus has been preselectably adjusted to produce a print of desired color rendition from a given transparency, all subsequent prints will be produced with fidelity of color. Also, while such apparatus has been herein schematically shown and described, it will be apparent that in its commercial form many of the various elements, such as transformers and the like may be combined, control push buttons may be employed to facilitate operation, and a multiple step switch may be utilized for the simultaneous adjustment of certain elements, such as the high ohmic resistors 69 into a series of steps, to provide still further arbitrary density corrections.

Although one specific embodiment of the present invention has been herein shown and described, it is to be understood that still further modifications thereof may be made without departing from the spirit and scope of the appended claims.

We claim:

1. An exposure control apparatus for photographic color printers and enlargers provided with a plurality of like density color filters for each of three primary colors which are successively operable into superimposed position in and out of the light beam to vary the intensity thereof passing through a film transparency and impinging upon sensitized paper during the making of a print, said exposure control apparatus comprising a light predicting circuit having adjustable means connected to a source of electrical energy and operable by an operator to preselect the production of a plurality of voltages proportional to the density and magnification of the film and also proportional to the intensities of light of several respective primary colors required for the making of a satisfactory photographic print, a light measuring circuit also connected to a source of electrical energy and operable to produce a plurality of voltages of like number as those corresponding to the primary colors produced by said light predicting circuit and said voltages as produced by the light measuring circuit being proportional to the intensities of light of the same primary colors passing through the enlarger lens of said photographic printer, a decision making circuit connected to said light predicting circuit and said light measuring circuit and provided with means respectively operable in response to a difference in voltage as produced by said light predicting circuit and said light measuring circuit for each of said respective corresponding primary colors for causing operation of an associated switching element, and a reversible motor connected to each one of the primary-color-varying filters of said photographic printer and operable in response to the operation of said switching element to cause said motor to rotate in one direction or the other and move its respective connetced filter into and out of the light beam of said photographic printer in response to the occurrence of the aforesaid voltage difference corresponding to each of said primary colors.

2. An exposure control apparatus for photographic color printers and enlargers as specified in claim 1 wherein the light predicting circuit comprises a density predicting arrangement and a color predicting arrangement, said density predicting arrangement including a potentiometer and a rheostat having one of their respective ends connected together and each having a movable contact with the input voltage of the circuit connected to one end of said potentiometer and to the movable contact of said rheostat, and the juncture of said potentiometer and said rheostat together with the movable contact of said potentiometer constituting an output voltage of the circuit and being connected to said color predicting arrangement, the movable contact of said potentiometer being registerable with a scale and adjustable therewith in accordance with the area of the film negative and the square of the magnification, and the movable contact of said rheostat being registerable with a scale and adjustable therewith in accordance with a preselected exposure time.

3. An exposure control apparatus for photographic color printers and enlargers as specified in claim 2 wherein the light predicting circuit comprises a color predicting arrangement comprising a plurality of potentiometers having a movable contact, one for each of the primary colors and connected in parallel to the output voltage from said density predicting arrangement with one end of each said potentiometers substantially at ground potential, a mechanical linkage interconnecting all the movable contacts of said potentiometers and operable to change the ratio of the displacements of each movable contact relative to its associated potentiometer while maintaining the sum of such displacements at zero, and each of the movable contacts of said potentiometers being connected to said decision making circuit.

4. An exposure control apparatus for photographic color printers and enlargers as specified in claim 1 wherein the light measuring circuit comprises a source of electrical potential having an assembly of a plurality of photoelectric tubes connected thereto with a filter of a different primary color in front of each respective photoelectric tube and positioned beneath the enlarger lens of said photographic printer so that light therefrom falls upon each of said photoelectric tubes after passing through its associated filter of one of the respective primary colors, a number of resistors connected respectively to each one of said photoelectric tubes and with one end of each such resistors substantially at ground potential and operable to pass a current in accordance with the intensity of the light falling upon each respective photoelectric tube, and the remaining end of said resistors being connected to said decision making circuit.

5. An exposure control apparatus for photographic color printers and enlargers as specified in claim 1 wherein the light measuring circuit comprises means operable to rectify, filter and ground one side of the output voltages from said light predicting circuit and to ground one side of the voltage sources produced by said light measuring circuit which are proportional to the intensities of light of the same primary colors as produced by said light predicting circuit, and the remaining side of all voltage sources of both said light predicting circuit and said light measuring circuit having the same polarity with respect to ground, and said remaining side of all voltage sources of both said circuits being connected to said decision making circuit to cause operation of the latter upon the occurrence of a difference between the voltage produced by said light predicting circuit and said light measuring circuit with respect to ground and corresponding to each of said primary colors.

6. An exposure control apparatus for photographic printers and enlargers as specified in claim 1 wherein the decision making circuit means operable in response to a difference in voltage corresponding to each one of the primary colors comprises a plurality of electronic control tubes each one having its grid connected to the output voltage from said light measuring circuit corresponding to one of said primary colors and its cathode connected to the output voltage from said light predicting circuit corresponding to the same one of the primary colors, with each such electronic control tube being operable in response to the occurrence of a voltage differential of definite magnitude between its respective cathode and grid.

7. An exposure control apparatus for photographic printers and enlargers as specified in claim 5 wherein said decision making circuit comprises a plurality of electronic control tubes each one having its grid connected to the output voltage from said light measuring circuit corresponding to one of said primary colors and its cathode connected to the output voltage from said light predicting circuit corresponding to the same one of the primary colors, with each one of said electronic control tubes being operable to control energization and deenergization of an associated relay coil, and each said relay having a pair of contacts connected to an associated reversible motor for causing said motor to rotate in one direction when said coil is energized and moves its armature into engagement with one of said contacts and causing said motor to rotate in the opposite direction when said coil is deenergized and moves its armature into engagement with the other of said contacts.

8. An exposure control apparatus for photographic printers and enlargers as specified in claim 5 wherein said decision making circuit comprises a plurality of electronic control tubes each one having its grid connected to the output voltage from said light measuring circuit corresponding to one of said primary colors and its cathode connected to the output voltage from said light predicting circuit corresponding to the same one of said primary colors, each said electronic control tube becoming conductive and non-conductive upon the occurrence of a voltage differential between its cathode and grid to cause energization and deenergization of an associated relay coil, and each said relay having a pair of contacts engageable by its armature with such pair of contacts being connected to separate shading coils of the reversible motor and independent of its alternating-current-energized field winding whereby one of said shading coils is energized when the relay armature engages one of said contacts in response to said electronic control tube becoming conductive to cause rotation of said motor in one direction, and the other of said shading coils being energized when the relay armature engages the other contact of said pair to cause rotation of said motor in the opposite direction upon deenergization of said relay coil by said electronic tube becoming non-conductive when a voltage differential of opposite magnitude occurs between its cathode and grid electrodes.

References Cited in the file of this patent

UNITED STATES PATENTS

| | | |
|---|---|---|
| 2,470,584 | Simmon | May 17, 1949 |
| 2,521,954 | Tuttle et al. | Sept. 12, 1950 |
| 2,561,535 | Paulet et al. | July 24, 1951 |
| 2,566,277 | Williams et al. | Aug. 28, 1951 |
| 2,673,488 | Bumstead | Mar. 30, 1954 |
| 2,764,060 | Horak | Sept. 25, 1956 |
| 2,794,366 | Canaday | June 4, 1957 |
| 2,995,978 | Glandon et al. | Aug. 15, 1961 |

FOREIGN PATENTS

| | | |
|---|---|---|
| 1,173,295 | France | Feb. 23, 1959 |
| 1,201,477 | France | July 15, 1959 |

OTHER REFERENCES

"A Fast-Acting Exposure Control System for Color Motion Picture Printing" (Streiffert), Journal of the Society of Motion Picture and Television Engineers, November 1952, vol. 59, No. 5, pages 410–416.